United States Patent [19]
Guy

[11] Patent Number: 5,964,313
[45] Date of Patent: Oct. 12, 1999

[54] MOTION CONTROL SYSTEM FOR MATERIALS HANDLING VEHICLE

[75] Inventor: Douglas S. Guy, Brantford, Canada

[73] Assignee: Raymond Corporation, Greene, N.Y.

[21] Appl. No.: 08/985,643

[22] Filed: Dec. 5, 1997

Related U.S. Application Data

[63] Continuation-in-part of application No. 08/688,579, Jul. 30, 1996, abandoned.

[51] Int. Cl.$^6$ ............................................. B62D 1/14
[52] U.S. Cl. ............................................. 180/332; 180/19.1
[58] Field of Search ................................. 180/19.1, 19.2, 180/19.3, 332, 333

[56] References Cited

U.S. PATENT DOCUMENTS

| | | | |
|---|---|---|---|
| 3,791,474 | 2/1974 | Stammen et al. | 180/332 |
| 4,140,200 | 2/1979 | Tucek | 180/333 |
| 4,573,543 | 3/1986 | Bataille | 180/19.1 |
| 4,629,020 | 12/1986 | Thurman | 180/19.2 |
| 4,716,980 | 1/1988 | Butler | 180/19.2 |
| 5,595,259 | 1/1997 | Gilliland et al. | 180/332 |

*Primary Examiner*—Kenneth R. Rice
*Attorney, Agent, or Firm*—Quarles & Brady, LLP

[57] ABSTRACT

The present invention is directed to an improved motion control system for a motorized hand/rider lift truck having a load bearing fork, electric traction motor, storage battery, steerable wheel, steering control mechanism, and a brake that includes a deadman brake mechanism. An electrical power circuit comprises a high speed control circuit and a low speed control circuit that control, respectively, a high speed travel mode and a low speed travel mode of the truck. The improved motion control system of the invention further comprises means for selecting the high or low speed travel mode and means for actuating an automatic coast control device that automatically overrides the deadman brake mechanism while the truck is in the low speed travel mode and deactivates the coast control device when the truck is in the high speed travel mode. The present invention is further directed to a coast control device for a hand/rider truck having a brake that includes a deadman brake mechanism, an electrical power circuit that includes high and low speed control circuits, and a steering mechanism that includes a steering arm movable to a position that causes engagement of the brake. The high and low speed circuits control, respectively, high speed and low speed travel modes of the truck.

21 Claims, 4 Drawing Sheets

MOTION CONTROL SYSTEM FOR MATERIALS HANDLING VEHICLE

CROSS-REFERENCE TO RELATED APPLICATIONS

This is a continuation in part of U.S. patent application Ser. No. 08/688,579 which was filed on Jul. 30, 1996 entitled Motion Control System For Materials Handling Vehicle, and now abandoned.

STATEMENT REGARDING FEDERALLY SPONSORED RESEARCH OR DEVELOPMENT

Not applicable.

BACKGROUND OF THE INVENTION

The present invention relates to materials handling vehicles and, more particularly, to a motion control system that provides automatic engagement and disengagement of a coast control device of an electric pallet truck whose operator may either walk alongside or ride on the vehicle.

An industrial materials handling vehicle such as a lift truck typically includes a load bearing fork, a steerable wheel, a steering control mechanism, a brake that includes a deadman brake mechanism, an electric traction motor, and a storage battery. The steering mechanism commonly includes a handle mounted at the end of a movable arm and including rotatable twist grips that control the speed and direction of the truck in both forward and reverse directions as well as controls for raising and lowering the fork. The handle may also include switches for reversing vehicle travel direction and sounding a warning horn.

Motorized hand/rider trucks, which can be operated by an individual either walking alongside or standing on a platform incorporated in the vehicle structure, are widely used for various materials handling applications. One particular type of hand/rider truck, a low lift order picker truck, is employed for picking stock in large warehouses. In such an operation, the operator typically follows an established route through the warehouse bays, walking alongside the truck when the distance between items of stock to be picked is short and stepping on the truck platform to ride when the distance between picks is longer. When the operator is riding on the truck, it is desirable for optimum work productivity to move the truck at higher speeds than when the operator is walking beside it. Speed controllers that include high and low speed control circuits and switches are known in the art.

Electric trucks commonly include a deadman brake mechanism that is maintained in a disengaged position by the operator bringing the steering arm into an operating range. If the operator leaves the truck, a handle return spring forces the arm out of the operating range, which causes actuation of a spring-loaded brake to stop the vehicle, thus preventing injury to the operator and other workers as well as material damage. The lift truck may be in either a braking or non-braking mode, depending on the position of a steering arm within specified braking and driving arcs. The steering arm may be restrained from entering the braking arc by manual engagement of a deadman brake override device.

Considerations of safety have led to the design of electric vehicle operation control systems that automatically respond to the position of the operator, who may be standing or sitting on the vehicle, or walking alongside. A variety of plural operating modes for electric trucks are known in the art. For example, braking and other functions may be controlled by an operator either standing or seated on a vehicle, with interlock switches provided to ensure proper operation of the vehicle in accordance with industry standards.

As noted previously, the steering mechanism of a lift truck commonly includes rotatable twist grips. Rotation of the grips in one direction causes the truck to move forward; rotation of the grips in the opposite direction causes the truck to move in reverse. Increasing rotation of the grip in either direction results in an increase in the power supplied to the electric motor, causing the truck to move at higher speed in either a forward or reverse direction.

In addition to the motion control provided by the rotatable twist grips, motorized low lift order picker trucks may also include a side, or "jog", switch, which can be turned on and off by an operator walking alongside the truck, enabling the vehicle to continue to move from one stock pick up position toward the next.

The efficiency of stock picking operations would be severely hampered if the brake were activated every time the operator leaves the truck to make a pick up. Thus, brake override, or coasting, systems have been devised to allow the deadman brake mechanism to be disengaged while the operator walks alongside the truck. Low lift order picker trucks with coasting systems that override the deadman brake mechanism are required by industry safety standards to provide means for the walking operator to apply the service brake and sound the warning horn as needed. Furthermore, the maximum speed allowable with such coasting systems must not exceed normal walking speed, about 3.5 mph (5.6 km/hr). One such system for deactivating a deadman brake is described in U.S. Pat. No. 4,716,980 which issued on Jan. 5, 1988 and is entitled "Control System for Rider Vehicles". In that system, a selector switch is used to select either normal high speed operation or coasting operation and additional switches which are independent of the selector switch are then used to drive a truck within one of two speed ranges depending on the operating mode selected.

Coasting systems for order picker trucks like the system described in the above referenced patent, while providing some facilitation of stock picking operations, require manual engagement of the deadman brake override control device by the vehicle operator to put the truck in its coast mode or disengage the coast mode for high speed travel. While infrequent manual activation of the deadman brake override control device might not be burdensome, in practice manual activation is a regular operation and repeated manual activation can be extremely tedious.

For at least this reason, a device that utilizes electrical signals from the truck's motion control circuits to provide appropriate automatic override of the deadman brake mechanism, thereby enhancing stock picking efficiency while maintaining operational safety requirements, would be highly advantageous. The motion control system and coast control device of the present invention provide this benefit.

BRIEF SUMMARY OF THE INVENTION

The present invention is directed to an improved motion control system for a motorized hand/rider lift truck having a load bearing fork, electric traction motor, storage battery, steerable wheel, steering control mechanism, and a brake that includes a deadman brake mechanism. An electrical power circuit comprises a high speed control circuit and a low speed control circuit that control, respectively, a high speed travel mode and a low speed travel mode of the truck.

The improved motion control system of the invention further comprises means for selecting the high or low speed travel mode and means for actuating an automatic coast control device that automatically overrides the deadman brake mechanism while the truck is in the low speed travel mode and deactivates the coast control device when the truck is in the high speed travel mode.

The present invention is further directed to a coast control device for a hand/rider truck having a brake that includes a deadman brake mechanism, an electrical power circuit that includes high and low speed control circuits, and a steering mechanism that includes a steering arm movable to a position that causes engagement of the brake. The high and low speed circuits control, respectively, high speed and low speed travel modes of the truck.

The coast control device of the invention comprises a movable housing sleeve closed at one end by a wall provided with a coast arm that is pivotally connected to the lower end of the steering arm. A spring capable of compression is situated and constrained between the housing sleeve and the wall. Located within the housing sleeve is a movable slide, and a stem movably mounted within the slide is provided at one end with engagement means for engaging the slide. At its other end, the stem is connected to actuator/deactuator means that are actuatable by an electrical signal generated within the high or low speed control circuit when the high or low speed, respectively, travel mode is selected.

An electrical signal within the low speed control circuit actuates the actuator/deactuator means and the shaft, causing the engagement means to engage the slide, thereby producing compression of the spring. The force of the compressed spring urges steering arm away from the position that would cause the brake to be engaged. The coast control device of the invention thereby provides automatic override of the deadman brake mechanism while the truck is in its low speed travel mode. An electrical signal within the high speed control circuit causes automatic deactuation of the engagement means.

According to the present invention, a single mechanism is provided for both selecting the low speed travel mode and for, after the low travel speed mode has been selected, controlling the truck in the low travel speed mode. For example, one or more jog buttons might be provided which can be pressed to select the low speed travel mode. Then, after the low speed mode is selected, the jog buttons can again be used to drive the truck in accordance with the low speed travel mode. Also, in one preferred embodiment, a single mechanism is provided for both selecting the high speed travel mode and for, after the high speed travel mode has been selected, controlling the truck in the high speed travel mode. For example, a rotatable hand grip might be provided. When the truck is in the low speed travel mode, by twisting the hand grip, the travel mode changes from low to high. Thereafter, the grip can be rotated to drive the truck at a speed within a high speed range.

Thus, selection of the low speed travel mode automatically prevents engagement of the deadman brake mechanism when the operator releases the steering arm, thereby allowing the truck to coast. The automatic override of the deadman brake mechanism while the truck is in the low speed travel mode, as provided by the motion control system of the present invention, enables a truck operator to increase stock picking efficiency without compromising operational safety.

DETAILED DESCRIPTION OF THE INVENTION

Figure 1:
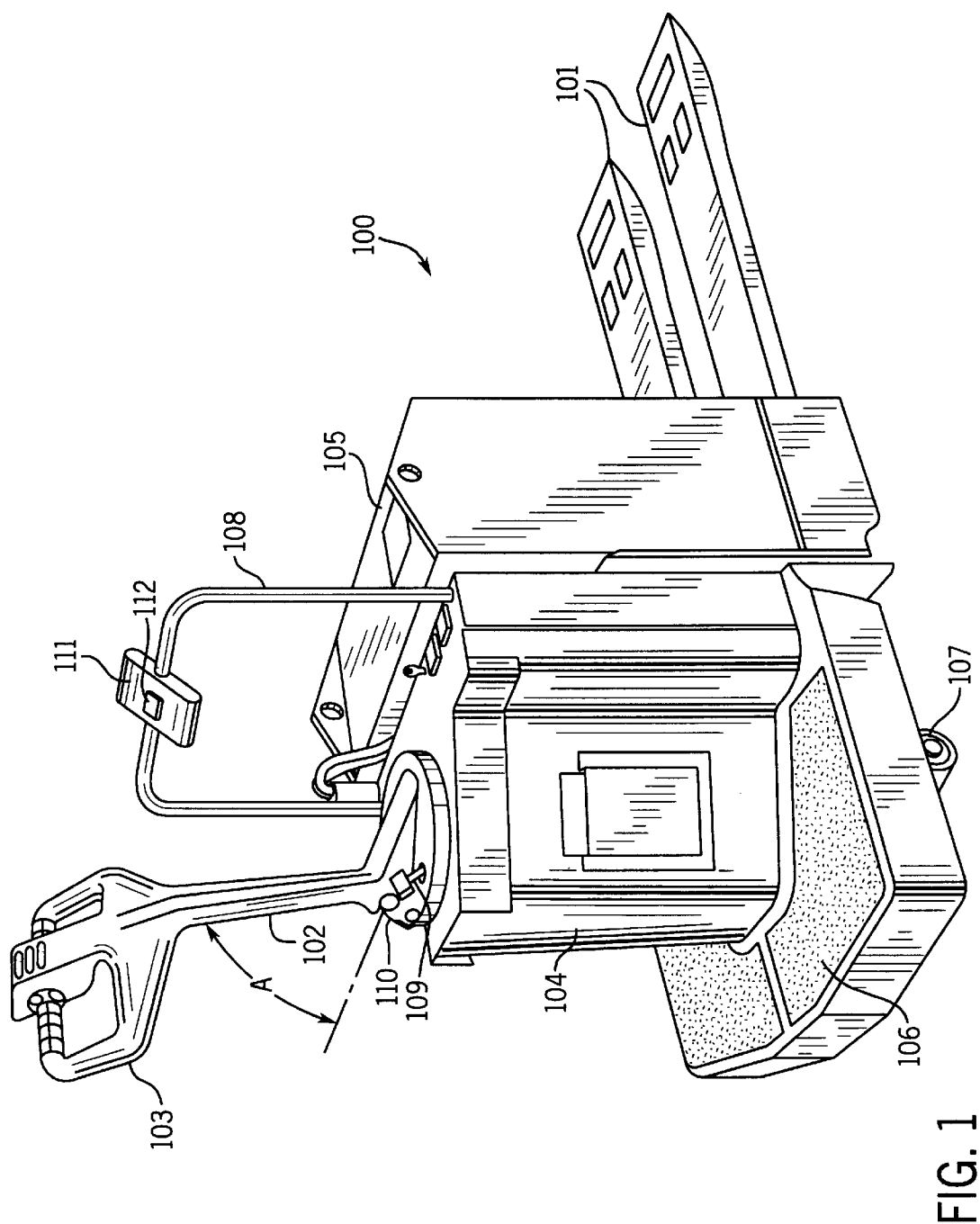
FIG. 1 is a perspective of a hand/rider truck showing a prior art manually actuated brake override control device.

FIG. 1 depicts a hand/rider truck 100 having a load bearing fork 101 and a steering control mechanism that includes a movable steering arm 102 and steering arm handle 103. The truck 100 is also provided with a traction motor (not shown) enclosed in a motor housing 104, a storage battery (not shown) enclosed in a battery housing 105, and a steerable wheel (not shown) located under a platform 106. The truck 100 is also usually equipped with small stabilizing casters 107 and a hand rail 108 that can be grasped by a riding operator standing on the platform 106.

The truck 100 is steerable by moving the steering arm 102 and handle 103 from side to side. The steering arm 102 is also movable up and down through an arc A that ranges from a nearly horizontal to a substantially vertical position and includes both driving and braking arcs. When the steering arm 102 is disposed in a near or substantially vertical position (as depicted in FIG. 1) or a near or substantially horizontal position, a switch (not shown) cuts power to the drive motor and actuates a brake to stop the vehicle. The vehicle brake can be engaged either manually by the operator forcing the arm 102 to a substantially vertical or horizontal position, or, in the situation where the operator releases the arm 102 while the truck is in motion, by activation of a deadman brake mechanism that automatically drives arm 102 into a braking arc. Engagement of the brake under the latter circumstances may be prevented by a deadman brake override device that allows the vehicle to operate in a coast mode.

Deadman brake override devices currently in use are typically manually engaged by the operator. An example of such a device is coast control lever 109, which may be located on a steering arm base housing 110, as depicted in FIG. 1. Moving the coast control lever into the "coast" position deactivates the deadman brake mechanism and constrains the vehicle to operate in the low speed mode.

The truck 100 is optionally provided with a console 111 attached to the hand rail 108. The console 111 includes a maximum speed control button 112, preferably spring-biased, that can be actuated by the operator to put the truck, after it has attained a predetermined speed, into the maximum speed travel mode.

Figure 2:
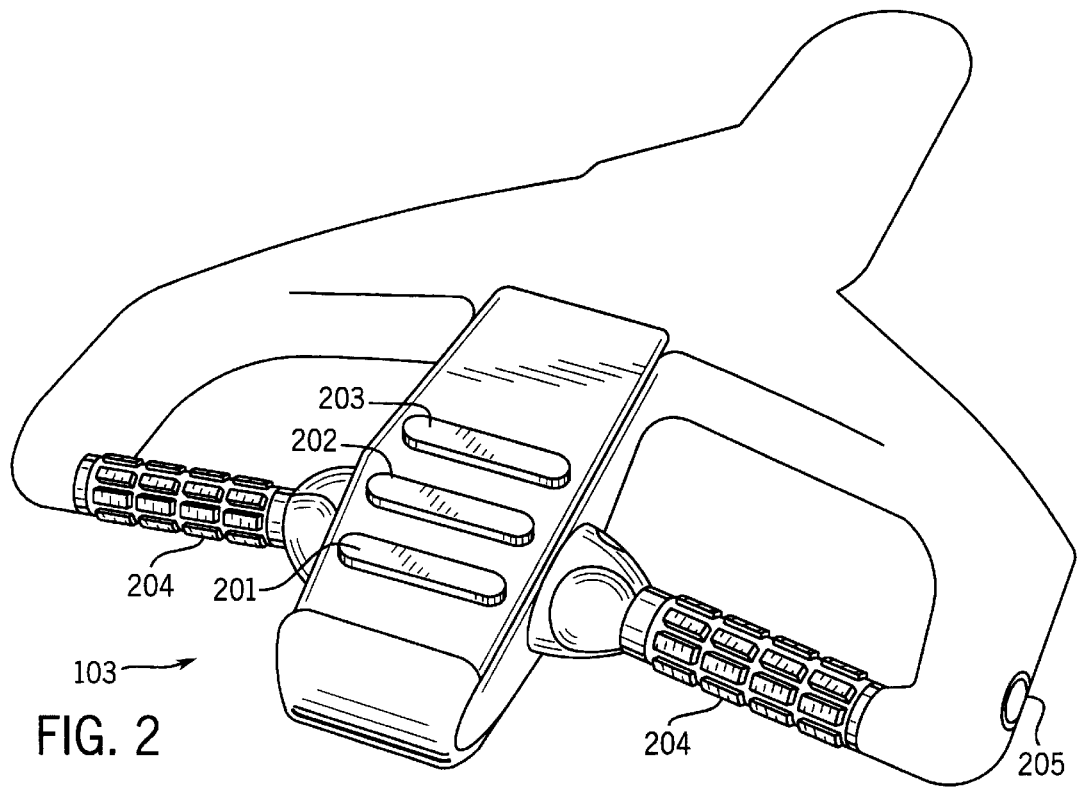
FIG. 2 is a perspective showing the details of a steering handle for a hand/rider truck.

FIG. 2 is a detailed perspective of the steering arm handle 103. Included in the handle 103 are fork control buttons 201 and 202 for moving the fork 101 (FIG. 1) in, respectively, a downward and an upward direction. The handle 103 is also provided with a horn control button 203 for sounding a warning horn (not shown).

The steering arm handle 103 further includes a first selector in the form of a pair of spring-biased rotatable hand grips 204 that actuate a switch in the high speed control circuit to move the vehicle in a forward or reverse direction, depending on the direction of rotation of the grips 204, at any speed within a first speed range. The high speed control circuit includes a variable control device such as, for example, a potentiometer that provides for increasing or decreasing the speed of the vehicle, depending on the extent of rotation of the hand grips 204. When the grips 204 have been rotated to their maximum position, which brings the vehicle typically to a speed of about 5.5 mph (9.2 km/hr), the operator may actuate the previously described maximum speed control button 112 (FIG. 1) to put the vehicle in the maximum speed travel mode of about 7.5 mph (12.5 km/hr). Release of the button 112 returns the vehicle to the speed produced by the rotation of the hand grips 204.

The steering arm handle 103 is further provided with a jog control button 205 that actuates the low speed control circuit, enabling the vehicle to move at a speed within a second speed range wherein the second speed range does not exceed normal walking speed.

Figure 3:
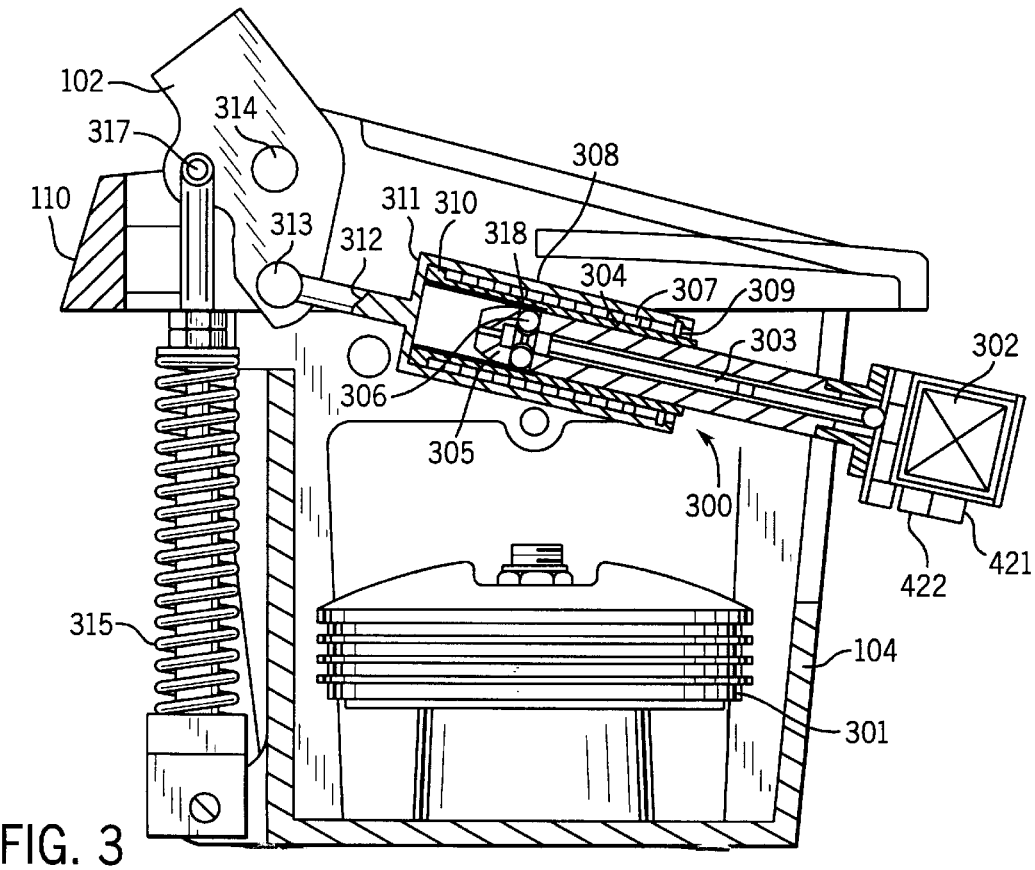
FIG. 3 is a partial cross-section depicting an embodiment of the coast control device of the present invention.

Unlike motion controllers of the prior art that require manual engagement of a brake override device to put a lift truck in a coast mode and subsequent manual disengagement of the device to take the truck out of the coast mode, the motion control system of the present invention provides automatic override of the deadman brake mechanism and maintenance of the truck in the coast mode while still enabling the operator to readily engage the service brake and stop the vehicle when required. FIG. 3 depicts an embodiment of the invention wherein a coast control device 300 is mounted within a motor housing 104 and extends into a steering arm base housing 110. The motor housing 104 encloses the brake assembly including a brake drum 301, and a drive train assembly, which includes a traction motor (not shown).

The coast control device 300 includes actuator/deactuator means, which may be, for example, a vacuum powered actuator or a solenoid that is associated with a compression or tension spring. In a preferred embodiment, the actuator/deactuator means comprises a coast solenoid 302 provided with first and second coast switches 421 and 422, respectively (see FIG. 4), which are actuatable by solenoid 302. The armature (not shown) of solenoid 302 is attached to a solenoid stem 303 that is movably mounted within a stem head 305 provided with a ball detente assembly 306. A coast spring 307 is situated between a slide 304 movably mounted on stem head 305 and a coast housing sleeve 308. The slide 304 is movable within the coast housing sleeve 308, and the coast spring 307 is constrained in its position between the slide 304 and the housing sleeve 308 by a spring retainer 309 connected to the sleeve at the end nearer the solenoid 302 and by a slide lug 310 connected to the slide 304 at the end remote from the solenoid 302. The housing sleeve 308 is provided with a coast housing wall 311 that closes the sleeve at the end remote from the solenoid 302.

The coast housing wall 311 has a coast arm 312 connected to a coast arm pivot 313 on the lower end of the steering arm 102. The steering arm 102 is movable during operation of the truck over a wide driving arc (A in FIG. 1) about a steering arm pivot 314 that is contained within or attached to the steering arm base housing 110. The lower end of the steering arm 102 is also connected to a return spring 315 via a return spring shaft 316 and a shaft pivot 317.

Actuation of solenoid stem 302 urges stem 303 toward solenoid 302, causing ball detente assembly 306 to engage slide 304 and thereby compress coast spring 307. The compression of spring 307 constrains steering arm 102 to remain within the driving arc.

Absent the motion control system of the present invention, release by the truck operator of the steering arm 102 would result in the movement of the arm at the urging of the return spring 315 to a substantially vertical position. This would consequently actuate the deadman brake mechanism to stop the vehicle. The motion control system of the present invention enables a stock picking operator to put the vehicle in the low speed "jog" mode and thereby automatically engage the coast control device, without requiring that the operator maintain hold of the steering handle or manually engage a brake override device requiring subsequent manual disengagement.

Figure 4:
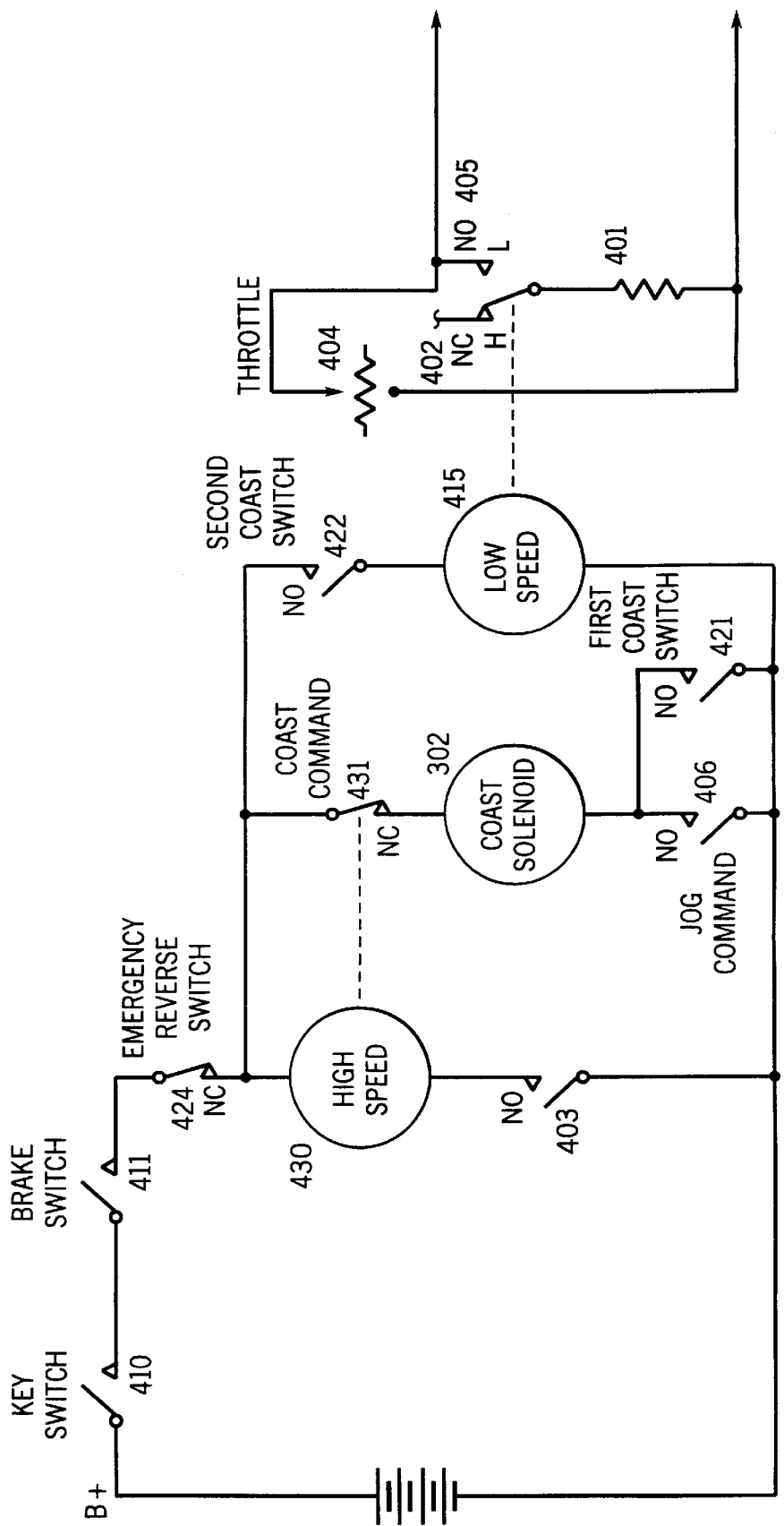
FIG. 4 is a schematic representation of the electrical power circuit of a truck in accordance with the present invention.

FIG. 4 is a schematic representation of the electrical power circuit of a truck in accordance with the present invention. Travel is enabled by closing key switch 410 and brake switch 411. Speed is controlled by the rotatable hand grips 204 (FIG. 2), which are provided with a variable speed control device 404 that may be, for example, a potentiometer. Moving hand grips 204 from their neutral position causes throttle command switch 403 to close and also energizes high speed relay coil 430, which maintains coast command switch 431 in the open position and thereby prevents the energizing of solenoid 302 (FIG. 3) and the consequent engaging of the coast mechanism. Further rotation of the hand grips 204 increases the throttle command input and the speed of the truck up to a speed of about 5.5 mph (9.2 km/hr). When the hand grips are rotated to command forward travel of the truck the operator may actuate maximum speed button 112 (see FIG. 1) to enable operation of a field weakening circuit (not illustrated but well know in the art) thereby increasing truck speed to 7.5 mph (12.5 km/hr). When hand grips 204 are returned to their neutral position such that forward command switch 403 is opened, operation of the field weakening circuit is inhibited.

When hand grips 204 are returned to their neutral position (whereby throttle command switch 403 is open and coast command switch 431 is closed) and steering arm 102 (FIG. 1) is in a position within the driving arc, the operator may engage jog control button 205 (FIG. 2), which closes jog command switch 406 and actuates coast solenoid 302, causing solenoid stem 303 to extend, thereby energizing first and second coast switches 421 and 422, respectively. Actuated second coast switch 422 enabling current to flow through low speed relay coil 415, thereby causing high speed contact 402 to open and low speed contact 405 to close. The closing of contact 405, which is preferably associated with a resistor 401, places the truck in the low speed jog travel mode. When the operator releases jog control button 205 (FIG. 2), causing jog command switch 406 to open, the actuation of coast solenoid 302 is maintained by first coast switch 421 remaining closed. The actuation of solenoid 302 and engagement of the automatic coast control mechanism is maintained until the operator moves hand grips 204 from their neutral position, or applies the service brake, or actuates emergency reverse switch 424 (by a control button, not shown), or turns off key switch 410.

If the operator returns the truck to the high speed travel mode by rotating hand grips 204 out of their neutral position, solenoid 302 is deactuated and coast switches 421 and 422 are opened. Appropriate electrical interlocks prevent the truck from being operated in the high speed mode while the coast control device is engaged.

In the operation of the motion control system of the present invention, the actuation of the solenoid 302 urges the solenoid stem 303 toward the solenoid 302, causing the ball detent assembly 306 to engage and constrain the slide 304 at a slide indent 318, which results in compression of the coast spring 307. The force of the compressed coast spring 307 opposes the force that is exerted by the return spring 315 to urge the steering arm 102 toward a vertical brake-engaging position. The force produced by the compression of the coast spring 307 urges the coast housing sleeve 308 and coast arm 312 toward the solenoid 302, thereby counteracting the force of the return spring 315 and preventing the unattended steering arm 102 from moving to the vertical. If the need arises, however, the operator can brake the truck to a stop by manually moving the steering arm 102 into the braking arc, thereby overriding the operation of the coast control device 300.

Other Preferred Embodiment

Figure 5:
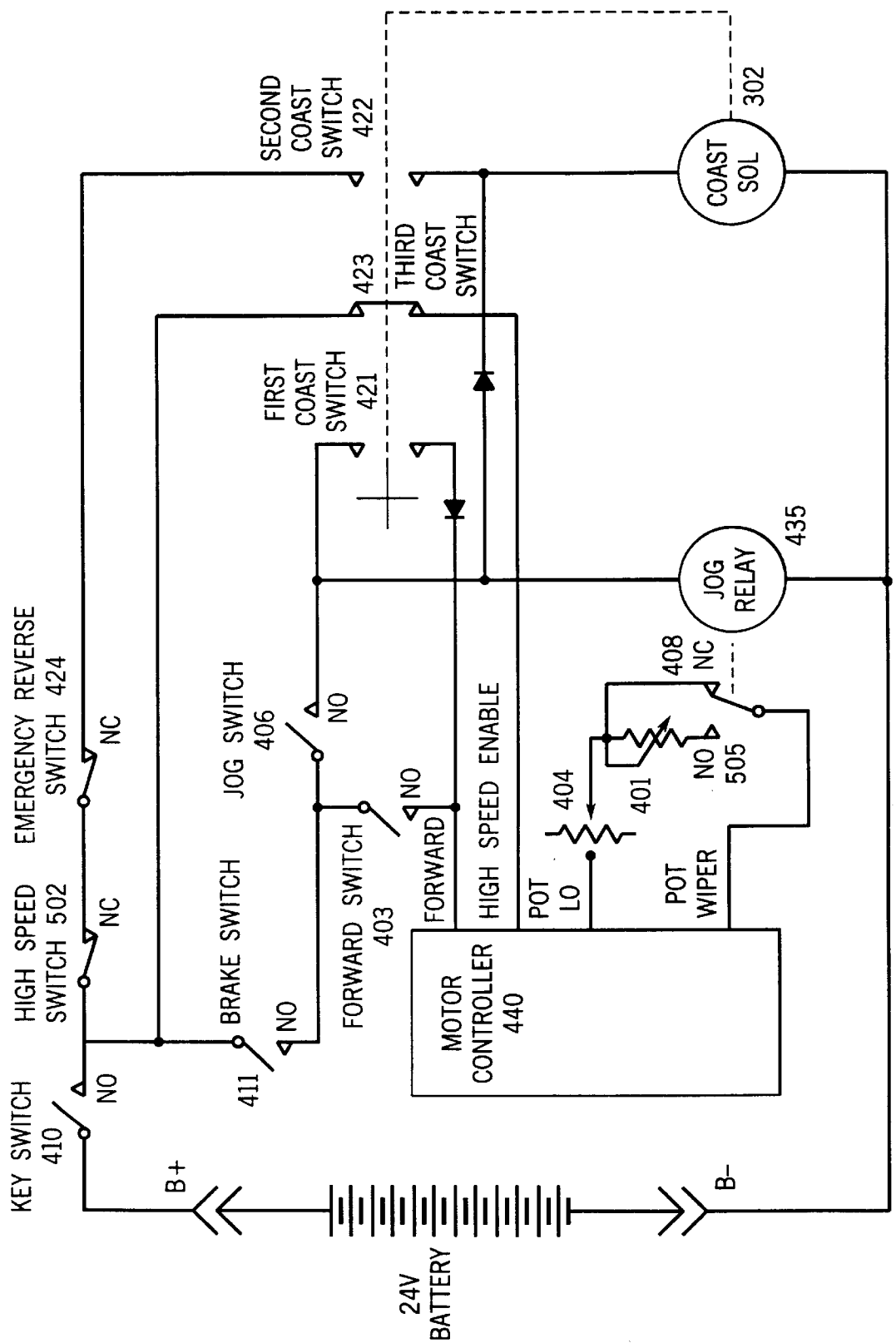
FIG. 5 is a schematic representation similar to the representation of FIG. 4, albeit for a second embodiment of the present invention.

FIG. 5 is a schematic representation of the electrical power circuit of a truck in accordance with a second embodiment of the present invention. Many of the components which form the circuit of FIG. 5 are identical to the components used to form the circuit of FIG. 4. For this reason, components in FIG. 5 which are identical to components in FIG. 4 are identified by identical reference numbers and only different components have been given unique numbers.

Referring to FIG. 5, in this embodiment truck travel is enabled by closing key switch 410 and brake switch 411. Speed is controlled by the rotatable hand grips 204 (FIG. 2), which are provided with a variable speed control device 404 that may be, for example, a potentiometer. Moving hand grips 204 from their neutral position causes throttle forward command switch 403 to close. Further rotation of the hand grips 204 increases the throttle command input and the speed of the truck up to a speed of about 5.5 MPH (9.2 km/hr). When the hand grips are rotated to command forward travel of the truck the operator may actuate maximum speed button 112 (see FIG. 1) to enable operation of a field weakening circuit (not illustrated but well known in the art) thereby increasing truck speed to approximately 7.5 MPH (12.5 km/hr). When hand grips 204 are returned to their neutral position such that forward command switch 403 is opened, operation of the field weakening circuit is inhibited.

When hand grips 204 are returned to their neutral position (whereby throttle forward command switch 403 is open) and steering arm 102 ( see FIG. 1) is in a position within the driving arc, the operator may engage jog control button 205 (see FIG. 2), which closes jog command switch 406 and actuates coast solenoid 302, causing solenoid stem 303 to extend, thereby energizing first and second coast switches 421 and 422, respectively. Actuated second coast switch 422 causes third coast switch 423 to open thus disabling high speed operation of the motor controller and enabling current to flow through coast solenoid 302 after jog switch 406 opens, thereby preventing the truck from operating in high speed mode for as long as the coast mechanism is engaged. Closure of switch 421 provides a path for the travel command from the jog switch 406 to the motor controller 440, placing the truck in the forward travel mode. At the same time, closure of the jog command switch 406 actuates the jog relay 435 which opens contact 408 and closes jog speed contact 505, which is preferably associated with a resistor 401, providing a throttle command input to the motor controller 440.

When an operator releases jog control button 205 (see FIG. 2), jog command switch 406 opens. However, coast solenoid 302 remains actuated as second coast switch 422 remains closed. Appropriate interlocks prevent the truck from being operated in the high speed mode while the coast control device is engaged. Solenoid 302 remains actuated and the automatic coast control mechanism remains engaged until the operator performs one of three different affirmative steps to disengage the coast mechanism. The three affirmative steps include actuating the maximum speed control button 112, which opens the high speed switch 502, actuating emergency reverse switch 424 (by a control button not illustrated), or turning off key switch 410.

If the operator returns the truck to the high speed travel by actuating the maximum speed control button 112, which opens the high speed switch 502, solenoid 302 is deactuated and coast switches 421 and 422 are opened and third coast switch 423 is closed thus placing the truck in the high speed travel mode and enabling high speed travel.

In operation, actuation of solenoid 302 urges solenoid stem 303 toward solenoid 302, causing ball detent assembly 306 to engage and constrain slide 304 at a slide indent 318, which results in compression of coast spring 307. The force of compressed coast spring 307 opposes the force that is exerted by return spring 315 to urge the steering arm 102 toward a vertical brake-engaging position. The force produced by the compression of coast spring 307 urges coast housing sleeve 308 and coast arm 312 toward solenoid 302, thereby counteracting the force of return spring 315 and preventing unattended steering arm 102 from moving to the vertical. If the need arises, however, the operator can brake the truck to a stop by manually moving the steering arm 102 into the braking arc, thereby overriding the operation of the coast control device 300.

This second embodiment illustrated in FIG. 5 provides slightly different control than the first embodiment illustrated in FIG. 4. With the first embodiment, the coast control mechanism can only be engaged by actuating button 205. Thereafter, low speed travel without disengaging the coast control mechanism can only be achieved by pushing button 205. While button 205 is depressed, the truck moves at a low speed. When button 205 is released, the truck coasts to a stop. When either hand grips 204 or maximum speed control button 112 are actuated, the coast control mechanism is disengaged and the deadman brake is functional. Thus, when the grips are twisted, the coast mechanism is disengaged and therefore the grips cannot be used effectively to jog the truck.

With the second embodiment, like the first, the coast control mechanism can only be engaged by actuating button 205. However, thereafter, until an operator performs one of three affirmative actions to disengage the coast control mechanism, either button 205 or grips 204 can be used to provide power to drive the truck. While the coast control mechanism is engaged, grips 204 can be used to select any speed which is less than the maximum speed achievable in the low speed operation mode. For example, if the maximum speed in the low speed operation mode is 3.0 MPH, grips 204 can be used to drive the truck at any speed between 0 and 3.0 MPH while the coast control mechanism is activated.

After an affirmative step to disengage the coast control mechanism, grips 204 can be used in high speed mode to achieve any speed between 0 and a maximum speed of the high speed operation mode (e.g. 5.5 MPH or 7.5 MPH when button 112 is pressed in the example above).

The invention has been described in detail with particular reference to certain preferred embodiments thereof, but it will be understood that variations and modifications can be effected within the spirit and scope of the invention.

PARTS LIST 100 hand/rider truck
101 fork
102 steering arm 103 steering arm handle
104 motor housing
105 battery housing
106 platform
107 casters
108 hand rail
109 coast control lever
110 steering arm base housing
111 console
112 maximum speed control button
201 fork control button
202 fork control button
203 horn control button
204 rotatable hand grip
205 jog control button
300 coast control device
301 brake drum
302 coast solenoid
303 solenoid stem
304 slide
305 stem head
306 ball detent assembly
307 coast spring
308 coast housing sleeve
309 spring retainer
310 slide lug
311 coast housing wall
312 coast arm
313 coast arm pivot
314 steering arm pivot
315 return spring
316 return spring shaft
317 return spring shaft pivot
318 slide indent
401 resistor
402 high speed contact
403 throttle command switch
404 variable speed control device
405 low speed contact
406 jog command switch
408 normal travel speed contact
410 key switch
411 brake switch
415 low speed relay coil
421 first coast switch
422 second coast switch
423 third coast switch
424 emergency reverse switch
430 high speed relay coil
431 coast command switch
435 jog relay
440 motor controller
502 high speed switch
505 jog speed contact

I claim:

1. In a motorized hand/rider lift truck comprising a load-bearing fork, an electric traction motor, a storage battery, a steerable wheel, a steering control mechanism, and a brake comprising a deadman brake mechanism, an improved motion control system comprising:

an electrical power circuit comprising a high speed control circuit and a low speed control circuit, said control circuits controlling, respectively, a high speed travel mode wherein the truck is operable within a first range of speeds and a low speed travel mode wherein the truck is operable within a second range of speeds, the second range being a lower range than the first range;

a first selector for selecting the high speed travel mode;

a second selector for selecting the low speed travel mode and for, after the low speed travel mode has been selected, controlling the traction motor to drive the truck at a speed within the second range until the high speed travel mode is selected;

an automatic coast control device for automatically overriding the deadman brake mechanism when actuated, the coast control device actuated when said low speed travel mode is selected and deactuated when said high speed travel mode is selected.

2. The motion control system of claim 1 wherein the first selector is also for, after the high speed travel mode has been selected, energizing the traction motor to drive the truck at a speed within the first range.

3. The motion control system of claim 1 wherein the steering control mechanism includes an arm having a distal end and a handle at the distal end, the arm is moveable through an arc to any of a plurality of positions including and between an essentially vertical position and an essentially horizontal position.

4. The motion control system of claim 3 wherein the second selector is located on the handle.

5. The motion control system of claim 4 wherein the first selector is also located on the handle, the first selector is a variable speed controller and the second selector includes at least one jog control button.

6. The motion control system of claim 5 wherein the variable speed controller is a potentiometer.

7. The motion control system of claim 5 wherein the variable speed controller includes at least one rotatable hand grip disposed on the handle.

8. The motion control system of claim 3 wherein the plurality of positions of the arm include at least one position within a braking arc wherein the arm selects the high speed mode of operation.

9. The motion control system of claim 8 wherein the at least one position within the braking arc wherein the arm selects the high speed mode of operation is the essentially vertical position.

10. The motion control system of claim 9 wherein the at least one position includes two positions including the essentially vertical position and the essentially horizontal position.

11. The motion control system of claim 8 wherein, when activated, the coast control device constrains movement of the arm to positions outside the braking arc.

12. The motion control system of claim 11 wherein the coast control device can be overridden by forcing the arm into either an essentially horizontal position or an essentially vertical position.

13. The motion control system of claim 8 further including a speed controller for, after the high speed travel mode has been selected, controlling the traction motor to drive the truck at a speed within the first range.

14. The motion control system of claim 13 wherein the speed controller is also for, after the low speed travel mode has been selected, controlling the traction motor to drive the truck at a speed within the second range.

15. The motion control system of claim 13 wherein the speed controller is a variable speed controller.

16. The motion control system of claim 15 wherein the variable speed controller is a rotatable hand grip disposed on the handle.

17. A motion control system of claim 1 wherein the actuator/deactuator means comprises a solenoid.

18. An automatic coast control device for a hand/rider truck provided with a brake comprising a deadman brake mechanism, a steering mechanism comprising a steering arm having an upper and a lower end, said steering arm being movable to a position causing engagement of said brake, an electrical power circuit comprising a high speed control circuit and a low speed control circuit, said control circuits controlling, respectively, a high speed travel mode and a low speed travel mode of said truck, and means for selecting said high speed or said low speed travel mode, said device comprising:

- a movable housing sleeve closed at one end by a wall provided with a coast arm pivotally connected to the lower end of said steering arm;
- a movable slide disposed within said housing sleeve;
- a spring capable of compression disposed and constrained between said housing sleeve and said slide;
- a stem movably mounted within said slide and provided at one end with engagement means for engaging said slide; and
- actuator/deactuator means connected to said engagement means for actuating said engagement means when said low speed travel mode is selected and said low speed control circuit is thereby energized and for deactuating said engagement means when said high speed travel mode is selected and said high speed control circuit is thereby energized;

whereby, generation of an electrical signal within said low speed control circuit actuates said actuator means, causing said engagement means to engage said slide, thereby producing compression of said spring, said compression urging said steering arm away from said position causing engagement of said brake, thereby automatically overriding said deadman brake mechanism while said truck is in said low speed travel mode.

19. The coast control device of claim 18 wherein said steering arm is provided with a handle connected to the upper end of said arm.

20. The coast control device of claim 19 wherein said means for selecting the low speed travel mode comprises a jog control button disposed on said handle.

21. The coast control device of claim 20 wherein said means for selecting the high speed travel mode comprises a rotatable hand grip disposed on said handle.

\* \* \* \* \*